(12) United States Patent
Yu et al.

(10) Patent No.: US 7,761,357 B2
(45) Date of Patent: Jul. 20, 2010

(54) INTERCOMPANY TRANSFER PROFIT TRACKING SYSTEM

(75) Inventors: Sherry Yu, San Francisco, CA (US); Ray Thng, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 16 days.

(21) Appl. No.: 12/126,470

(22) Filed: May 23, 2008

(65) Prior Publication Data

US 2009/0292639 A1 Nov. 26, 2009

(51) Int. Cl.
*G06Q 40/00* (2006.01)
(52) U.S. Cl. ........................................................ 705/35
(58) Field of Classification Search ................ 235/385; 525/191; 705/1, 7, 28, 30–45; 709/206; 715/739, 810; 717/168; 725/37, 47, 143; 726/1, 27
See application file for complete search history.

(56) References Cited

U.S. PATENT DOCUMENTS

| | | | |
|---|---|---|---|
| 2003/0055696 A1* | 3/2003 | Tsukishima et al. | 705/7 |
| 2003/0101102 A1* | 5/2003 | Kim | 705/26 |
| 2003/0101107 A1* | 5/2003 | Agarwal et al. | 705/28 |
| 2004/0162771 A1* | 8/2004 | Tamatsu et al. | 705/30 |
| 2005/0256789 A1* | 11/2005 | Matsuoka | 705/30 |
| 2005/0289039 A1* | 12/2005 | Greak | 705/37 |
| 2006/0184928 A1* | 8/2006 | Hughes | 717/168 |
| 2006/0259319 A1* | 11/2006 | Mattiola et al. | 705/1 |
| 2007/0168209 A1* | 7/2007 | Shah | 705/1 |

OTHER PUBLICATIONS

Interoperation support for electronic business, Yang, Jian; Papazoglou, Mike P, Association for Computing Machinery. Communications of the ACM v43n6 pp. 39-47, Jun. 2000.*

What Drives Enterprises to Trading via B2B E-Marketplaces? Yu, Chian-Son, Journal of Electronic Commerce Research v8n1 pp. 84-91, 93-100, 2007.*

Shyam Sundar Santhanam, "Transfer Price Accounting in Oracle SCM, Oracle, An Oracle White Paper", Feb. 2006, pp. 1-30, Hyderabad, India.

IDC "IDC Executive Brief, Oracle E Business Suite 12", Oct. 2006, pp. 1-15, Farmingham, MA.

Sharma Manda, "Overview of Intercompany Invoicing, An Oracle White Paper", pp. ii-31, Jul. 2005, Redwood Shores, CA.

* cited by examiner

*Primary Examiner*—James P Trammell
*Assistant Examiner*—Tien C Nguyen
(74) *Attorney, Agent, or Firm*—Squire, Sanders & Dempsey, LLP

(57) ABSTRACT

A system receives an intercompany transfer of a plurality of goods from a first entity to a second entity. The intercompany transfer results in an internal profit/loss. The system stores the internal profit/loss in a first entity internal profit/loss element that is assigned to the second entity. The system then receives a external transfer from the second entity to an external entity of at least one of the plurality of goods. The system then automatically realizes a portion of the internal profit/loss for the first entity based on the external transfer and the first entity internal profit/loss element.

15 Claims, 4 Drawing Sheets

Los Angeles (LA) | New York (NY)

| | LA Inv. | | LA P/L | | LA Rec | | NY Pay | | NY Inv. | | LA P/L in NY | | NY COGS | | NY Rec | | NY Rev | |
|---|---|---|---|---|---|---|---|---|---|---|---|---|---|---|---|---|---|---|
| | Dr | Cr | Dr | Cr | Dr | Cr | Dr | Cr | Dr | Cr | Dr | Cr | Dr | Cr | Dr | Cr | Dr | Cr |
| 202 LA buys 10 books from an external supplier at $12 each. | 204 120 | | | | | | | | | | | | | | | | | |
| 206 LA sells 10 books to NY at a transfer price of $18 each. | | 208 120 | 210 | 60 | 212 180 | | | 214 180 | 216 120 | | 215 | | | | | | | |
| 220 NY sells 1 book to an external customer at $21 | | | | | | | | | 222 | 12 | 218 60 | | 224 6 | 226 18 | | | | |
| 228 AR Invoice | | | | | | | | | | | | | | | 230 21 | | 232 | 21 |

Fig. 2

INTERCOMPANY TRANSFER PROFIT TRACKING SYSTEM

FIELD OF THE INVENTION

One embodiment is directed generally to a financial computer system, and in particular to a financial computer system that tracks intercompany transfer profits.

BACKGROUND INFORMATION

Managing intercompany transactions/transfers is one of the biggest challenges impacting finance departments. Intercompany transfers are transactions between two or more related internal legal entities with common control (i.e., in the same enterprise) in which one business unit invoices another. In some companies, in particular when goods are transferred between entities, the goods are transferred at a price that is different from the sender's cost. In these transactions, accounting regulations require that internal profits/losses due to such transfers are eliminated from the income statement as long as the goods are still owned by the company. However, once the goods or items incorporating the goods are sold to an external party, the internal profits/losses can be realized and shown on the income statement.

Known financial computer systems, such as the E-Business Suite, Release 12, from Oracle Corp., can eliminate internal profits/losses for intercompany transfers. However known financial computer systems do not provide a mechanism to automatically realize internal profits/losses when the transferred items are sold to an external party.

SUMMARY OF THE INVENTION

One embodiment is a system that receives an intercompany transfer of a plurality of goods from a first entity to a second entity. The intercompany transfer results in an internal profit/loss. The system stores the internal profit/loss in a first entity internal profit/loss element that is assigned to the second entity. The system then receives a external transfer from the second entity to an external entity of at least one of the plurality of goods. The system then automatically realizes a portion of the internal profit/loss for the first entity based on the external transfer and the first entity internal profit/loss element.

BRIEF DESCRIPTION OF THE DRAWINGS

FIG. 2 is a table illustrating an example of an intercompany transfer and sale to an external company in accordance with one embodiment.

DETAILED DESCRIPTION

One embodiment is a corporate financial computer system that stores internal profits/losses for intercompany transfers of goods, or the difference between the sender's cost and the transfer price. With this stored information the system can automatically calculate the internal profits/losses that need to be realized when an item is issued to an external party.

Figure 1:
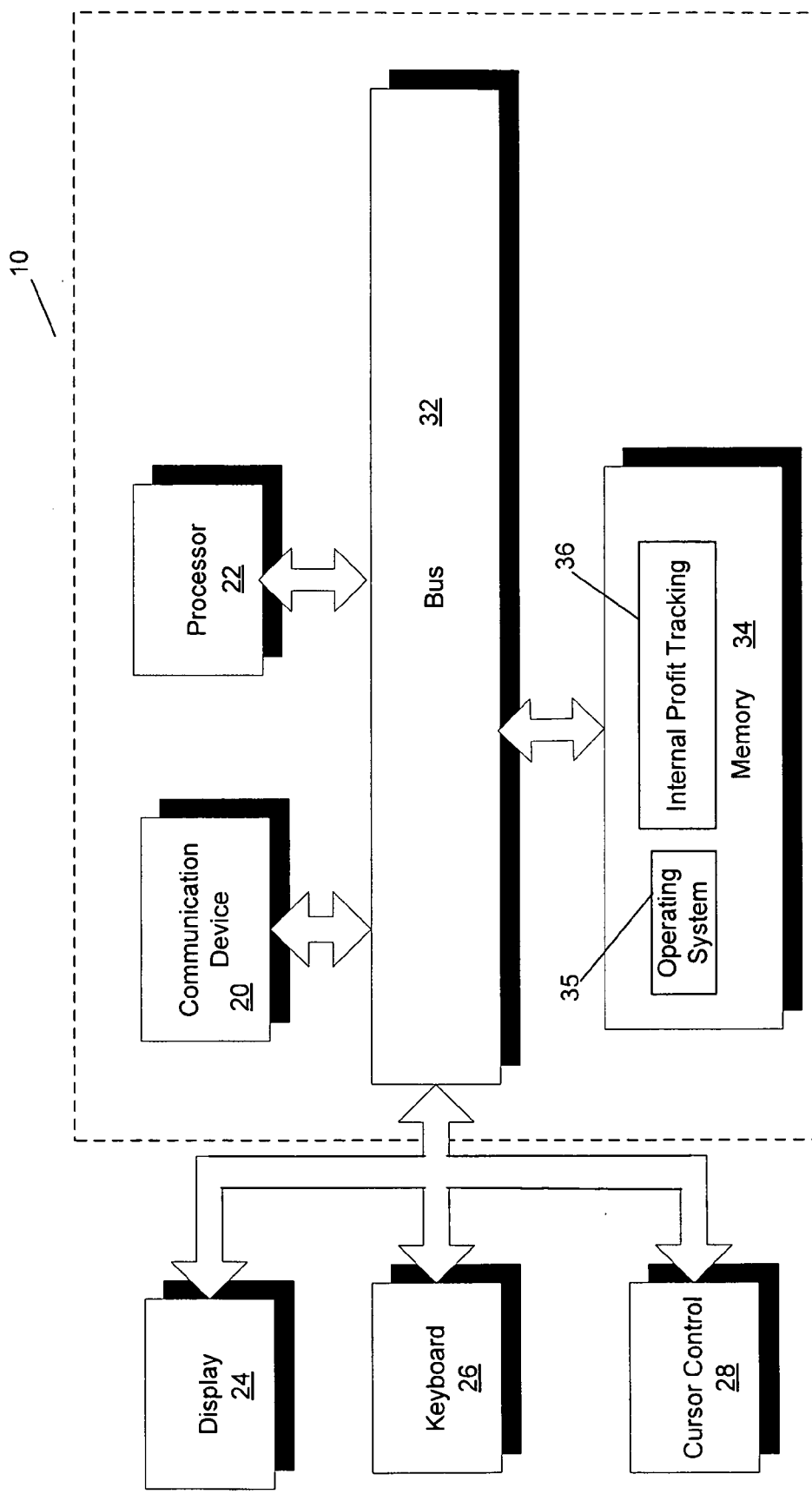
FIG. 1 is a block diagram of a system that can implement an embodiment of the present invention.

FIG. 1 is a block diagram of a system 10 that can implement an embodiment of the present invention. System 10 includes a bus 32 or other communication mechanism for communicating information, and a processor 22 coupled to bus 32 for processing information. Processor 22 may be any type of general or specific purpose processor. System 10 further includes a memory 34 for storing information and instructions to be executed by processor 22. Memory 34 can be comprised of any combination of random access memory ("RAM"), read only memory ("ROM"), static storage such as a magnetic or optical disk, or any other type of computer readable media. System 10 further includes a communication device 20, such as a network interface card, to provide access to a network.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 32 to a display 24, such as a Liquid Crystal Display ("LCD"), for displaying information to a user. A keyboard 26 and a cursor control device 28, such as a computer mouse, is further coupled to bus 32 to enable a user to interface with system 10.

In one embodiment, memory 34 stores software modules that provide functionality when executed by processor 22. The modules include an operating system 35 that provides operating system functionality for system 10. The modules further include an internal profit tracking module 36 that tracks internal profits for intercompany transfers, as disclosed in more detail below. In another embodiment, communication device 20 is coupled to the Internet or other network, and system 10 executes an Internet browser, such as the Internet Explorer from Microsoft Corp., and executes a web-based software application via the browser and via an Internet web server that transmits and receives data over the Internet. In this embodiment, internal profit tracking module 36 is located and executed on the web server and displayed on system 10 via the browser. Internal profit tracking module 36 can also be located on a server and accessed via a client in any other client/server arrangement.

In one embodiment, when transfers within a company are valued at something other than cost, adjustments are made to the consolidated income statement and balance sheet. The profit and losses due to these transfers are eliminated from the consolidated income statement. For the balance sheet, the inventory valuation is adjusted to reflect the true cost of the goods that are still on hand. In one embodiment, the system allows a user to automatically track the amount that needs to be eliminated from the consolidated income statement and to determine the true cost of the goods that are still on hand.

FIG. 2 is a table illustrating an example of an intercompany transfer and sale to an external company in accordance with one embodiment. In the example of FIG. 2, a book retailing company has a subsidiary in Los Angeles ("LA") and in New York ("NY").

At 202, LA buys 10 books from an external supplier at $12 each. This results in a $120 debit in LA inventory (204).

At 206, LA sells 10 books to NY at a transfer price of $18 each (i.e., an intercompany transfer of goods). As a result, $120 is credited in LA inventory (208), $60 is credited in LA profit/loss (210), which is the internal profit from the internal sale of the books. $180 is also debited in LA receivables (212). On the NY side, $180 is credited as payable (214) and $120 is debited as inventory (216). Further on the NY side, a new instance of a cost element that keeps track of the LA profit/loss is created. This element, referred to as an internal profit/loss element 215, is assigned to the legal entity (i.e., NY) that receives goods through intercompany transfers. $60 is debited (218) to LA profit/loss element 215 to reflect the profit to LA based on the intercompany transfer 206. At this point, LA's total profit is $60 as indicated at 210, and LA's realized profit is $0, which can be calculated by subtracting the $60 at 218 from the $60 at 210.

At 220, NY sells 1 book to an external customer at $21. At this point, system 10 automatically realizes a portion of the internal profit as the books are issued to an external party. It does this by crediting $12 from NY inventory (222) and debiting $18 in NY cost of goods sold (226). $6 is credited in entity 215 at 224 to reflect a credit in the LA internal profit. LA's total realized profit can now be calculated as the $60 in LA P/L—the $54 in LA P/L in NY element 215 (i.e., 60 (218)—6 (224)), or $6.

At 228, an accounts receivable invoice is issued for the external sale, resulting in a $21 debit in the NY receivables (230) and a $21 credit in NY revenue (232).

Although the example shown in FIG. 2 involves a single intercompany transfer, other embodiments automatically determine realized profit/loss for any number of intercompany transfers. Each receiving entity has an internal profit/loss element for every entity along the transaction chain that has an intercompany transfer. For example, in the example of FIG. 2 there may be a third entity in New Jersey (NJ). A book may be the subject of two intercompany transfers, for example from LA to NY, and then from NY to NJ before being sold by NJ to an external entity. In this embodiment, NY will have element 215 that tracks LA P/L in NY, and NJ will have an element that tracks LA P/L in NJ and another element that tracks NY P/L in NJ.

Figure 3:
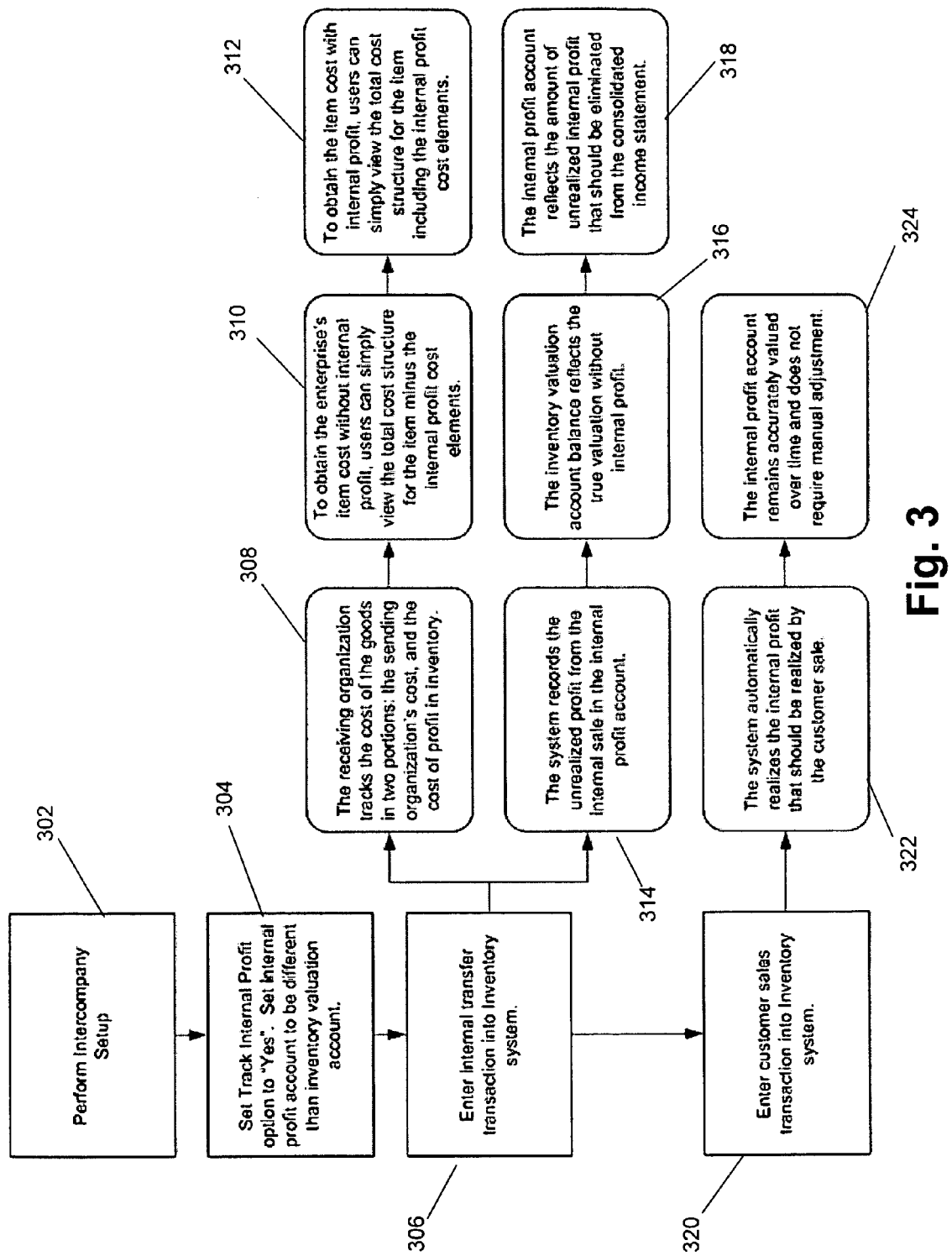
FIG. 3 is a flow diagram of the functionality of the system for tracking the profit of intercompany transfers in accordance with one embodiment.

FIG. 3 is a flow diagram of the functionality of system 10 for tracking the profit of intercompany transfers in accordance with one embodiment. In one embodiment, the functionality of the flow diagram of FIG. 3, and FIG. 4 below, is implemented by software stored in memory or other computer readable or tangible media, and executed by a processor. In other embodiments, the functionality can be performed by hardware, or any combination of hardware and software.

At 302, intercompany is setup in system 10. In one embodiment, setup includes defining all entities that are considered "internal" entities so that any transfer of goods between these entities are correctly classified as intercompany transfers. Further, for every entity that purchases goods through an intercompany transfer, a profit/loss element for all of the selling entities is established, such as profit/loss element 215 of FIG. 2.

At 304, the Track Internal Profit is set to "Yes" and the internal profit account is set to be different from the inventory valuation account.

At 306, when a intercompany transaction takes place (e.g., 202 of FIG. 2), it is entered into the system.

At 308, the receiving organization (e.g., NY in FIG. 2) tracks the cost of goods in two portions or elements: the sending organization's cost and the cost of profit in inventory.

At 310, a user can obtain the enterprise's item cost without internal profit by viewing the total cost structure for the item minus the internal profit cost elements.

At 312, a user can obtain the enterprise's item cost with internal profits by viewing the total cost structure for the item including the internal profit cost elements.

At 314, the system records the unrealized profit from the internal sale (i.e., the intercompany transfer) in the internal profit account element (e.g., profit/loss element 215 of FIG. 2).

At 316, the inventory valuation account element balance reflects the true valuation without internal profit.

At 318, the internal profit account reflects the amount of unrealized profit that should be eliminated from the consolidated income statement.

At 320, a customer sales transaction (i.e., sale to an external entity) is entered into the inventory system.

At 322, the system automatically realizes the internal profit that should be realized by the customer sale.

At 324, the internal profit account remains accurately valued over time and does not require manual adjustment, as is required by the prior art.

Figure 4:
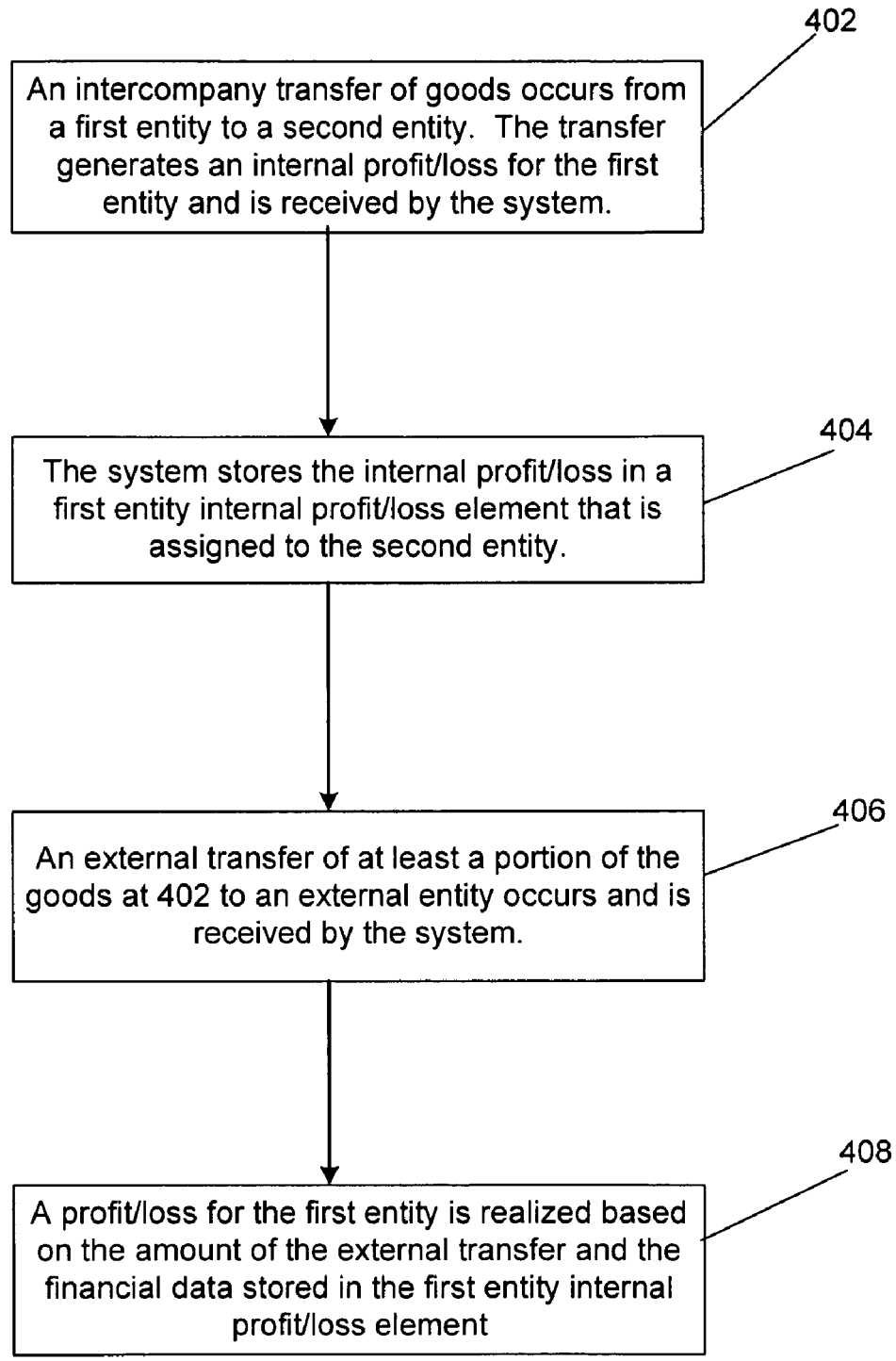
FIG. 4 is a flow diagram of the functionality of the system in accordance with one embodiment.

FIG. 4 is a flow diagram of the functionality of system 10 in accordance with one embodiment.

At 402, an intercompany transfer of goods occurs from a first entity to a second entity. The transfer generates an internal profit/loss for the first entity. System 10 receives the financial details in one embodiment through user entry or through other computer financial systems such as an Enterprise Resources Planning ("ERP") system. The intercompany transfer has an internal profit or loss ("profit/loss").

At 404, system 10 stores the internal profit/loss in a first entity internal profit/loss element that is assigned to the second entity.

At 406, an external transfer of at least a portion of the goods at 402 to an external entity occurs. System 10 receives the financial details of the external transfer.

At 408, system 10 allows the first entity to realize at least a portion of the internal profit/loss. The amount of realized profit/loss is based on the amount of the external transfer and the financial data stored in the first entity internal profit/loss element.

As disclosed, embodiments allow internal profits of intercompany transfers to be automatically realized upon an external transfer. When transferring from one entity into another, the difference between the transfer price and the true cost in the sender is automatically stored into internal profit/loss cost elements assigned to the receiver. The corresponding amount is stored in internal profit/loss accounts. If the cost in the sender already includes some internal profit/loss cost elements, these details will be retained in the receiver. This allows for tracking of internal profit/loss by legal entity. To determine true inventory value (without internal profit/loss), the system takes the cost structures of the quantity on hand and excludes the internal profit/loss cost elements. When goods are issued out of the receiver into an external party (or maybe another legal entity), the system determines the appropriate amount of Internal profit/loss as true profit based on the cost information in the internal profit/loss cost elements.

The embodiments disclosed above are for non-arms-length transfers. Other embodiments can be used for arms-length transfers. In these embodiments, the first entity's internal profit is stored in the second entity as disclosed above. However, for the arms-length transfer, at 402 of FIG. 4 the intercompany transfer does not explicitly generate an internal profit/loss for the first entity. Instead, the profit for the first entity is implicitly calculated as the first entity's revenue minus the first entity's cost of goods sold.

Further, the examples disclosed above are for the transfer of physical goods (i.e., books). However, embodiments can also be used for logical transfers. For example, LA may place an order for goods from an external supplier that are to be shipped to NY. The goods are shipped directly from the supplier to NY (i.e., a physical transfer of goods) but customers may also record a "financial" or "logical" transfer from LA to NY, in which they can reflect this service performed by LA. In some instances LA may charge a markup for that service, resulting in an internal profit being generated between LA and NY. Embodiments can handle this internal profit as the example disclosed in FIG. 2.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A computer-implemented method for tracking intercompany transfer profits, comprising:
   receiving an intercompany transfer of a plurality of goods from a first entity to a second entity, the intercompany transfer having an internal profit/loss;
   storing the internal profit/loss in a first entity internal profit/loss element that is assigned to the second entity;
   receiving an external transfer of at least one of the plurality of goods from the second entity to an external entity; and
   electronically calculating a portion of the internal profit/loss for the first entity based on the external transfer and the first entity internal profit/loss element.

2. The computer-implemented method of claim 1, wherein the storing comprises debiting the internal profit/loss in the first entity internal profit/loss element.

3. The computer-implemented method of claim 2, further comprising:
   crediting the portion of the internal profit/loss in the first entity internal profit/loss element.

4. The computer-implemented method of claim 1, wherein the portion of the internal profit/loss corresponds to at least a portion of the plurality of goods.

5. The computer-implemented method of claim 1, further comprising:
   receiving a second intercompany transfer of an amount of the plurality of goods from a third entity to the first entity having a second internal profit/loss; and
   storing the second internal profit/loss in a third entity internal profit/loss element that is assigned to the first entity.

6. The computer-implemented method of claim 5, further comprising:
   storing the second internal profit/loss in an additional third entity internal profit/loss element that is assigned to the second entity.

7. The computer-implemented method of claim 1, wherein the transfer comprises a non-arms-length transfer.

8. The computer-implemented method of claim 1, wherein the transfer comprises an arms-length transfer.

9. The computer-implemented method of claim 1, wherein the transfer comprises a physical transfer.

10. The computer-implemented method of claim 1, wherein the transfer comprises a logical transfer.

11. A computer readable non-transitory medium having instructions stored thereon that, when executed by a processor, causes the processor to:
   receive an intercompany transfer of a plurality of goods from a first entity to a second entity, the intercompany transfer having an internal profit/loss;
   store the internal profit/loss in a first entity internal profit/loss element that is assigned to the second entity;
   receive an external transfer of at least one of the plurality of goods from the second entity to an external entity; and
   automatically calculate a portion of the internal profit/loss for the first entity based on the external transfer and the first entity internal profit/loss element.

12. The computer readable medium of claim 11, wherein said instructions further cause the processor to:
   receive a second intercompany transfer of an amount of the plurality of goods from a third entity to the first entity having a second internal profit/loss; and
   store the second internal profit/loss in a third entity internal profit/loss element that is assigned to the first entity.

13. A computer system, comprising:
   first receiving means for receiving an intercompany transfer of a plurality of goods from a first entity to a second entity, the intercompany transfer having an internal profit/loss;
   first storage means for storing the internal profit/loss in a first entity internal profit/loss element that is assigned to the second entity;
   second receiving means for receiving an external transfer of at least one of the plurality of goods from the second entity to an external entity; and
   realizing means for automatically calculating a portion of the internal profit/loss for the first entity based on the external transfer and the first entity internal profit/loss element.

14. The computer system claim 13, further comprising:
   third receiving means for receiving a second intercompany transfer of an amount of the plurality of goods from a third entity to the first entity having a second internal profit/loss; and second storage means for storing the second internal profit/loss in a third entity internal profit/loss element that is assigned to the first entity.

15. A computer system, comprising:
   a processor;
   a memory coupled to the processor, the memory comprising internal profit tracking instructions that comprise instructions for causing the processor to:
   receive an intercompany transfer of a plurality of goods from a first entity to a second entity, the intercompany transfer having an internal profit/loss,
   store the internal profit/loss in a first entity internal profit/loss element that is assigned to the second entity,
   receive an external transfer of at least one of the plurality of goods from the second entity to an external entity, and
   automatically calculate a portion of the internal profit/loss for the first entity based on the external transfer and the first entity internal profit/loss element.

\* \* \* \* \*

UNITED STATES PATENT AND TRADEMARK OFFICE
CERTIFICATE OF CORRECTION

| | | |
|---|---|---|
| PATENT NO. | : 7,761,357 B2 | Page 1 of 1 |
| APPLICATION NO. | : 12/126470 | |
| DATED | : July 20, 2010 | |
| INVENTOR(S) | : Sherry Yu et al. | |

It is certified that error appears in the above-identified patent and that said Letters Patent is hereby corrected as shown below:

In column 6, line 34, in claim 14, delete "system" and insert -- system of --, therefor.

Signed and Sealed this
Twenty-sixth Day of April, 2011

David J. Kappos
*Director of the United States Patent and Trademark Office*